Nov. 15, 1949     W. J. KREPS     2,487,929

DIAMOND TOOLHOLDER

Filed Dec. 29, 1947

Inventor
Walter J. Kreps
By Donald G. Dalton
His Attorney

Patented Nov. 15, 1949

2,487,929

UNITED STATES PATENT OFFICE 2,487,929

DIAMOND TOOLHOLDER

Walter J. Kreps, East Cleveland, Ohio

Application December 29, 1947, Serial No. 794,391

4 Claims. (Cl. 77—58)

This invention relates to a diamond tool holder and more particularly to a diamond tool holder for holding an industrial diamond securely in position so as to make satisfactory use of it as a cutting tool when recutting the inner contours of large size wire drawing dies. The tool holders as used up to the present time are not entirely satisfactory in that they do not hold the diamond securely in position during a heavy cutting operation. The present tool holders are not as rugged in design nor are they as simple in their structural details as the tool of my invention.

It is an object of my invention to provide a diamond cutting tool holder which is inexpensive and rugged in construction.

Another object is to provide such a tool holder that is simple in design and which will hold the diamond cutting tool firmly in position under extremely heavy cutting operations.

These and other objects will be more apparent after referring to the following specification and attached drawings, in which.

Figure 1:
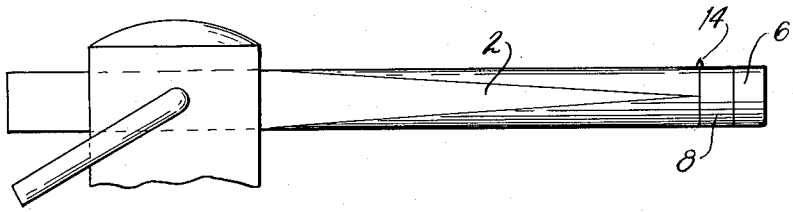
Figure 1 is a side elevation of the tool assembly.
Figure 2:
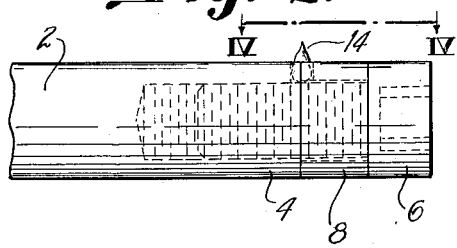
Figure 2 is an enlarged side elevation of the tool holder.
Figure 3:
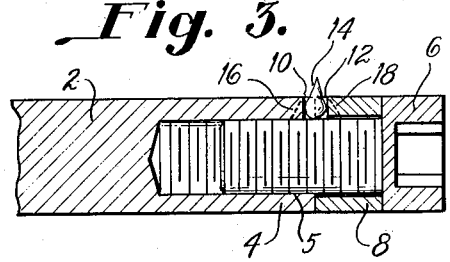
Figure 3 is a sectional view taken on the axis of the main body of the tool holder and bisecting the notches.
Figure 4:
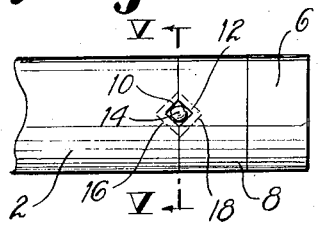
Figure 4 is a plan view taken on line IV—IV of Figure 2.
Figure 5:
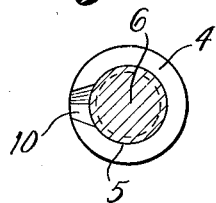
Figure 5 is a sectional view taken on line V—V of Figure 4 with the diamond cutter removed.

Referring more particularly to the drawings, the reference numeral 2 indicates the main body of the tool holder, the end 4 of which is drilled and tapped as at 5 to receive screw 6 which secures collar 8 to the end portion 4, the shaft of said screw being shorter in length than the depth of the hole 5 plus the length of the collar 8. A notch 10 is cut into the end portion 4 of shank 2 and a complementary notch 12 is cut in collar 8. Notches 10 and 12 can be cut in such a manner that, when matched together, they form a square or rectangle whose sides are parallel to each other, as shown, or they can be undercut so that the sides incline inwardly as indicated by the dotted lines 16 and 18. In other words, the sides of the notches in the first instance are substantially perpendicular to the tangent of the tool at the radius extending through the center of the notches and in the second instance the sides of the notches are undercut to better lock the diamond in place. The opening formed when notches 10 and 12 are matched, as shown, provides a seat for the diamond cutting tool 14.

The tool holder is assembled by placing the collar 8 adjacent to the end portion 4 with its notch 12 matched with notch 10 in the end portion of the shank, the shaft of screw 6 is then threaded part way into hole 5 through collar 8, the diamond cutting tool is placed within the opening defined by notches 10 and 12 and screw 6 is tightened to compress collar 8 against the diamond 14. The sidewalls of notches 10 and 12 bear against diamond 14 and hold it securely in position by the compressive force set up by screw 6. After being assembled, the tool holder is secured in the tool post of a lathe and used in the same manner as any conventional boring tool.

While one embodiment of my invention has been shown and described, it will be apparent that other adaptations and modifications may be made without departing from the scope of the following claims.

I claim:

1. A diamond tool holder comprising an elongated shank, said shank having a threaded hole in one end thereof and a notch in the outer edge of said end, a collar adjacent the notched end of said shank, the edge of said collar adjacent the shank having a notch matching the notch in said shank and providing a seat for the diamond tool, and a screw threaded into the hole in said shank through said collar with its head bearing against the collar.

2. A diamond tool holder comprising an elongated shank, said shank having a threaded hole in one end thereof and a notch in the outer edge of said end, a collar adjacent the notched end of said shank, the edge of said collar adjacent the shank having a notch matching the notch in said shank and providing a seat for the diamond tool, and a screw threaded into the hole in said shank through said collar with the head bearing against the collar, the depth of said hole plus the length of the collar being greater than the length of the shaft of said screw.

3. A diamond tool holder comprising an elongated shank, said shank having a threaded hole in one end thereof and a notch in the outer edge of said end, a collar adjacent the notched end of said shank, the edge of said collar adjacent the shank having a notch matching the notch in said shank, the sides of said notches being substantially perpendicular to the tangent at the radius extending through the center of the notches, said notches providing a seat for the diamond tool, and a screw threaded into the hole in said shank through said collar with its head bearing against the collar, the depth of said hole plus the length of the collar being greater than the length of the shaft of said screw.

4. A diamond tool holder comprising an elongated shank, said shank having a threaded hole in one end thereof and a notch in the outer edge of said end, a collar adjacent the notched end of said shank, the edge of said collar adjacent the shank having a notch matching the notch in said shank, the sides of said notches being undercut and providing a seat for the diamond tool, and a screw threaded into the hole in said shank through said collar with the head bearing against the collar, the depth of said hole plus the length of the collar being greater than the length of the shaft of said screw.

WALTER J. KREPS.

REFERENCES CITED

The following references are of record in the file of this patent:

UNITED STATES PATENTS

| Number | Name | Date |
|---|---|---|
| 297,728 | Teetor | Apr. 29, 1884 |
| 1,547,108 | Ellis | July 21, 1925 |